Sept. 6, 1966        S. H. SCHWARTZ        3,270,431

DRYER AND AUTOMATIC BELT SHIFTER

Filed June 1, 1964        2 Sheets-Sheet 1

INVENTOR.

*Samuel H. Schwartz*

BY

*Hill, Sherman, Meroni, Gross & Simpson*

ATTORNEYS

Sept. 6, 1966  S. H. SCHWARTZ  3,270,431
DRYER AND AUTOMATIC BELT SHIFTER
Filed June 1, 1964  2 Sheets-Sheet 2

INVENTOR.
Samuel H. Schwartz
BY
ATTORNEYS

United States Patent Office 3,270,431
Patented Sept. 6, 1966

3,270,431
DRYER AND AUTOMATIC BELT SHIFTER
Samuel H. Schwartz, Deerfield, Ill., assignor to The Dole Valve Company, Morton Grove, Ill., a corporation of Illinois
Filed June 1, 1964, Ser. No. 371,709
20 Claims. (Cl. 34—48)

This invention generally relates to a belt shifting mechanism and more particularly relates to an automatic thermally activated belt shifting mechanism.

In a laundry appliance or dry cleaner type drying system, a blower is used to drive a stream of temperature-controlled air through a treatment zone. Generally, it is desired to vary the speed of the blower to adjust the volume of air flowing through the treatment zone. The speed of the blower is varied by providing the blower with a multiple pulley groove driving hub with the multiple grooves having different diameters. The blower is driven by a pulley belt selectively shiftable between the grooves and drivingly connected to a single speed electric motor. The present invention provides a belt shifting mechanism which instantaneously and automatically shifts the pulley belt between the multiple grooves to vary the blower speed when a temperature change in the dryer drum is sensed, as well as having a means thereon for controlling the heat input into the dryer system. Further, the belt shifter has a manual override control means for operating the belt shifter manually if a speed shift is desired at some time other than that provided by the automatic controls.

Therefore, it is an object of the present invention to provide a belt shifter which reacts relatively instantaneously to changes in temperature to shift a pulley belt in accordance to desired conditions.

It is another object of the present invention to provide an instantaneous reacting pulley belt shifter which automatically shifts a pulley belt and has a manual override thereon.

It is still another object of the present invention to provide a blower for a dryer wherein the blower shaft has a driving hub characterized by multiple pulley grooves of different diameter and wherein a pulley belt may be selectively shifted instantaneously between the grooves to vary the flow volume of air discharge by the blower.

It is still another object of the present invention to provide an over-center belt shifting mechanism.

It is still another object of the present invention to provide an over-center belt shifting mechanism which is thermally actuated.

It is still another object of the present invention to provide an over-center lever type belt shifting mechanism connected to a dryer system having means to thermally actuate said belt shifter and means to manually override said belt shifting mechanism.

These and other objects, features, and advantages of the present invention will become more apparent from a careful consideration of the following detailed description, when considered in conjunction with the accompanying drawings illustrating preferred embodiments of the present invention, and wherein like reference numerals and characters refer to like corresponding parts throughout the several views therein.

The present invention is described in conjunction with a dryer blower having a blower driving hub with two pulley grooves of different diameter. The blower is driven by a pulley belt connected to the blower hub and a single speed motor. The speed of the blower is varied by selectively shifting the pulley belt between the two blower hub grooves by the belt shifter of the present invention. The belt shifter comprises a U-shaped belt engaging and actuating member having two spaced apart legs. One belt shifter leg is a stationary flat member and the other belt shifter leg is a freely rotatable roller member preferably having a concave outer surface. The rotating member is adapted to engage the pulley belt and move it from the driving hub groove of lesser diameter to the driving hub groove of greater diameter and the stationary flat arm is adapted to shift the pulley belt from the large diameter driving hub groove to the small diameter driving hub groove. The belt actuating member is connected to a first lever which is pivotally connected to a second lever mechanism which in turn is pivotally connected to a frame. An over-center tension spring means connects the second lever with a third lever pivotally connected to the frame.

A thermostatically controlled power member is positioned to pivot the third lever mechanism with respect to the frame. The initial pivoting of the third lever causes no corresponding movement of the first and second levers and these levers are instantaneously pivoted by the over-center spring mechanism only after the third lever is pivoted a predetermined distance. However, in order to provide greater leverage for the over-center spring means, the first lever arm is not simultaneously pivoted with the second lever arm but means are provided to allow the second lever to pivot relative to the first lever arm before said first lever arm is pivoted thereby.

Attached to the belt shifter frame is a heat input switch which may be activated and deactivated by the first lever to increase or decrease the heat input to the dryer.

Figures 1, 2:
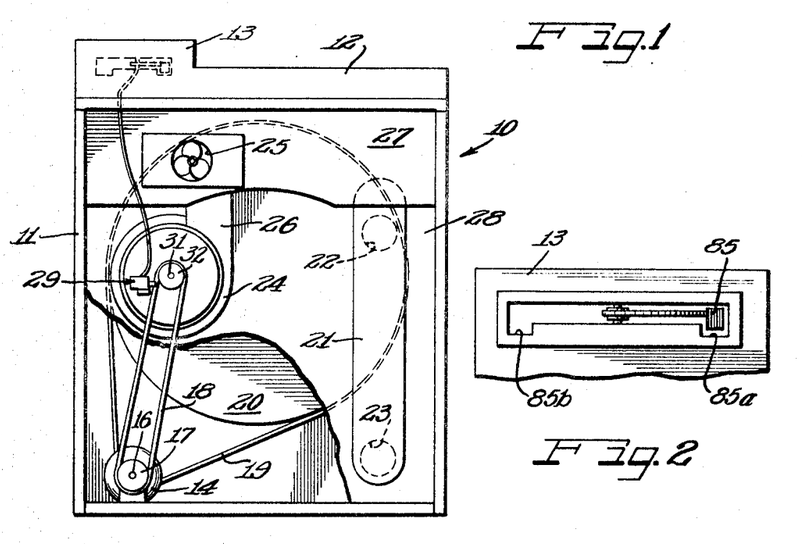
FIGURE 1 is a rear elevational view with parts broken away of a dryer incorporating a belt shifter constructed in accordance with the principles of the present invention.
FIGURE 2 is an enlarged partial front view with parts in elevation, of the manual override control lever of the belt shifter of the present invention.

Referring to FIGURE 1, there is generally shown a dryer apparatus 10 having a casing 11 with a console panel 12 and a control tower 13 on one side thereof. The rear of the machine is illustrated with the back wall removed to expose the operating components of the dryer 10. The dryer 10 has a single speed electric motor 14 having a drive shaft 16 to which is attached a pulley 17 cooperating with a blower pulley belt 18.

The motor 14 also drives a belt 19 which is trained over the outer periphery of a drum 20 which is mounted for rotation on axially disposed shaft (not shown) and thereby provides a closed treatment zone within the drum. The laundry machine 10 incorporates the usual air system to which a stream of ventilated air is directed. In this connection, the air stream includes a vertical conduit 21 which is mounted on the rear of the dryer and having a temperature-condition air outlet 22 which leads to the interior of the drum 20. Thermal energy is added to the air stream in the conduit 21 to temperature-condition the air which passes through the air inlet 23. A blower 24 is located on the rear of the machine and draws moisture-laden air to a vent 25 which extends from the blower outlet 26 through the partial back panel 27.

An exhaust outlet which coincides with the blower inlet is also provided for the treatment zone in the bulk head 28. Vent 25 may be connected to a suitable pipe if the machine is vented to the outside atmosphere or else the discharging moisture-laden air may vent directly into the space in which the dryer is located.

It is contemplated that the volume flow of air driven through the treatment zone as well as the temperature input are selectively variable. In order to accomplish this, the belt shifter 29 of the present invention is mounted adjacent the blower 24 and is adapted to cooperate therewith. The blower 24 has a drive shaft 31 having a drive hub or pulley 32 retained in corotatable assembly therewith by suitable means. The blower 24 is a common type of blower having impeller vanes which are driven through the drive hub 32 by the pulley belt 18.

Figure 3:
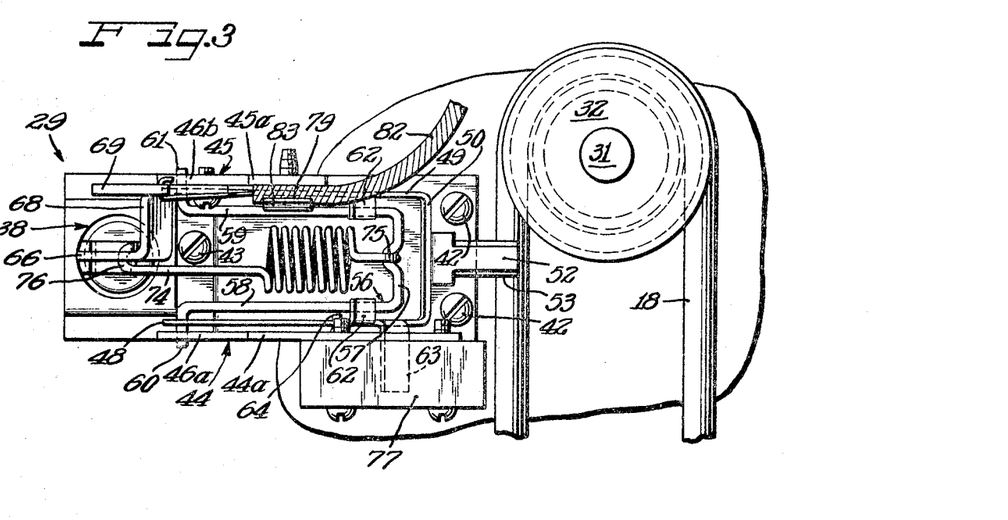
FIGURE 3 is an enlarged partial side view, with parts in elevation, of the belt-shifter constructed in accordance with the principles of the present invention.
Figure 4:
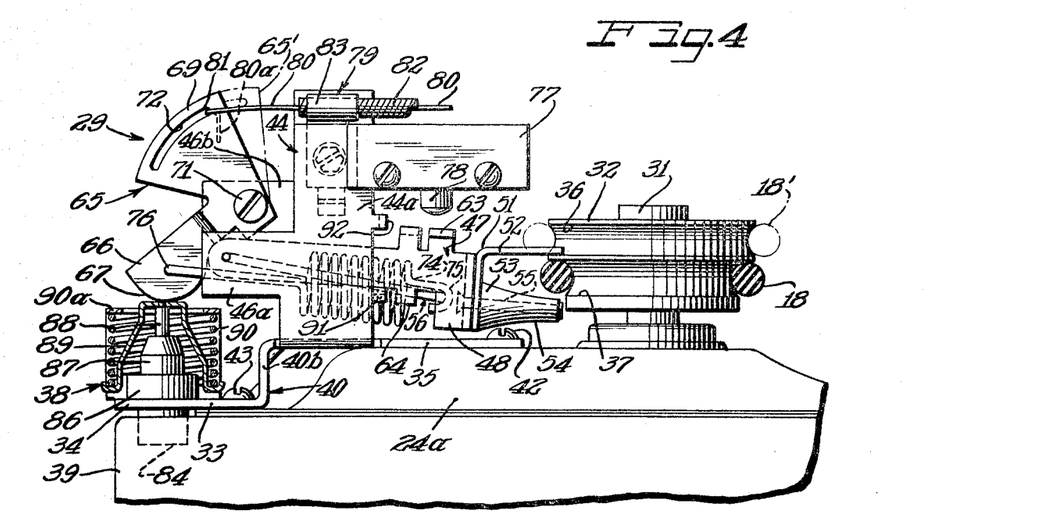
FIGURE 4 is a partial bottom view with parts in elevation of the belt shifter illustrated in FIGURE 2 and constructed in accordance with the principles of the present invention.

Referring to FIGURES 3 and 4, the blower hub 32 has formed in the peripheral surface thereof a pair of grooves 36 and 37 which are of different diameters. The groove 36 has a larger diameter than the groove 37. Thus, when the pulley belt 18 is within the groove 37, the blower is rotated faster than when the belt 18 is in the groove 36.

In order to selectively adjust the rotating speed of the blower, the belt 18 is selectively shifted between the grooves 36 and 37 by the belt shifting mechanism 29 which is controlled by a thermostat 38 mounted on a drum housing 39. The belt shifter 29 has a frame comprising a base angle bracket 40 with one angle arm 38 suitably connected to the drum housing 39 by bolt or screw 43 and having fork legs 34 adapted to hold the thermostat 38 therebetween. The angle bracket other arm 35 is suitably connected by bolts or screws 42 to the rear of the blower housing 24a.

Extending outwardly substantially perpendicular to the outer side of the front angle arm 35 adjacent the angle bracket connecting arm 40b are a pair of spaced mounting brackets 44 and 45 which are integral with or affixed to the base plate 40 by suitable means such as welding. The mounting brackets 44 and 45 each respectively have central rectangular portions 44a and 45a and integral rearwardly extending leg portions 46a and 46b.

A U-shaped lever or pivot arm 47 is pivotally mounted to and between the mounting brackets 44 and 45. The U-shaped lever has legs 48 and 49 rearwardly extending from their interconnecting base 50 which is rearwardly spaced a predetermined distance away from the pulley belt 18. The lever legs 48 and 49 are pivotally connected to the bracket mounting legs 46a and 46b, as will be hereinafter described in greater detail.

Extending centrally from the lever base 50 towards the pulley belt 18 is a belt shifting means 51 having an outer stationary leg 52 and an inner plastic roller leg 53. The stationary leg 52 is suitably affixed to the lever base 50 and the roller leg 53 is freely rotatably mounted on a shaft 55 having its axis intersecting the axis of the pulley belt 18. The shaft 55 is suitably mounted to the lever base 50. The roller 53 has a concave outer surface 54 and the legs 52 and 53 extend forwardly a predetermined distance such that they overlap the belt 18 and further, are spaced apart a predetermined distance such that the belt 18 may freely move therebetween.

A U-shaped spring mount lever or pivot arm 56 is mounted within the U-shaped lever 47 and extends substantially parallel therewith. The base 57 of the spring lever 56 is spaced rearwardly a predetermined distance from the lever base 50 and has its legs 58 and 59 extending rearwardly therefrom and spaced inwardly a predetermined distance from the lever legs 48 and 49 respectively. The ends of the spring lever legs 58 and 59 are turned outwardly to form pivot legs or pins 60 and 61. The pivot legs 60 and 61 pass through the lever legs 48 and 49 adjacent the ends thereof to form the pivot pin therefor and also pass through the bracket rear legs 46a and 46b to form the pivot for the spring mount lever 56.

The lever legs 48 and 49 each have spaced integral inturned stop flange means 62 and 64 extending inwardly a predetermined distance from their outer and inner walls such that they overlap the spring mount legs 58 and 59 positioned therebetween. The lever arm 48 also has adjacent the flange 62 an outwardly or downwardly extending actuating flange means 63.

An angular lever bar 65 has a central arm 66, a side arm 69, and an interconnecting arm 68. The central arm 66 is located rearwardly of and extends between the mounting brackets 44 and 45 and has a rounded inner wall 67 adapted to engage the thermostat 39. The side arm 69 extends parallel to the upper bracket 44 and is pivotally mounted to the inner wall of the upper bracket 44 by suitable pivot means 71. The side arm 69 has a segment type configuration with an arcuate slot 72 formed adjacent the outer wall thereof. A tension coil spring 74 is mounted between the spring lever 56 and has one end 75 connected to the spring lever base 57 and the other end 76 connected to the central pivot arm 66.

A switch 77, which is adapted to change the heat input rate of a gas valve or electrical heat input means, preferably a two rate gas valve or two separate electrical heat input means, is mounted to the bottom wall of the bottom bracket 44 adjacent the outer end thereof and has its contact means 78 spaced a predetermined distance from the flange means 63 when the pulley belt 18 is in the inner groove 37, as is illustrated in FIGURES 3 and 4. The switch 77 is connected to the gas valve or electrical means by suitable means (not shown).

A manual override means 79 comprising a bowden wire 80 having on end 80a thereof slidably mounted in the slot 72 and normally abutting against the forward end 81 of the slot 72. The bowden wire 80 passes through a suitable casing 82 which is mounted on the top bracket 45 by sleeve 83. The lever arm 65 may be manually pivoted from its position illustrated in FIGURES 3 and 4 to a position 65' by pivoting control arm 85 from its automatic control station 85a to its manual control station 85b (FIGURE 2).

The thermostat 39 is a typical thermostat that automatically controls the belt shifter and has a power unit with a temperature sensitive portion 84 in communication with the treatment zone within the drum 20; a power unit collar 86 and a power unit guide portion 87; and a power member 88 connected to a spring guide 89. The power member 88 extends within the temperature sensitive portion 84 and is axially moved by expansion of the temperature sensitive material within the temperature sensitive portion 84. The axial movement of the power member 88 outwardly is resisted by compression spring means 90 having one end thereof connected to the spring guide 89 and the other end connected to a stirrup or casing means 90a.

In operation, the thermostat temperature sensitive portion 84 senses a temperature change in the treating zone. This axially moves the power member 88 outwardly to pivot the lever arm 66 outwardly. The continuous outward pivot motion of the lever arm 66 moves the axis of the over-center tension spring 74 towards the axis of the spring lever 56. When the axis of the spring passes the axis of the spring lever the over-center actuation of the spring takes place. That is, the spring lever is then urged pivotally outwardly by the tension spring to abut against the inwardly projecting outer stop flanges 62 so that the spring may outwardly pivot the lever 47 from a position of greater leverage than if it had remained in its original position in contact with the inwardly extending inner flanges 64. The lever 47 then moves the roller 53 into engagement with the belt 18. The outward motion of the lever arm raises the belt 18 to the groove 36 as indicated at 18' in FIG- URE 4 with the freely rotatable roller 53 allowing the belt to continuously move with as little as possible frictional resistance. Also, the actuating flange 63 contacts and depresses the actuator 78 to activate the switch 77. Thus, the blower 30 is rotated slower and the respective heat input is changed to its second heat input rate by the switch 77.

Likewise, when the temperature of the treatment zone needs readjusting in the opposite manner, the thermostat senses said change and the power member 88 is moved axially inwardly. The spring 74 pivotally urges the lever arm 66 inwardly. As the axis of the spring 74 approaches the axis of the spring lever 56, the lever arm 47 remains in its outward position. When the axis of the spring passes the axis of the spring lever 56, the spring lever is pivoted inwardly to abut the inner stop flanges 64 and then the spring lever urges the lever arm 47 inwardly such that the inner surface of the stationary arm 52 engages the belt and urges the belt from its position 18' in the groove 36 to the groove 37. The pivot motion of the lever arm 47, in both its outward and inner direction, is limited by spaced outer and inner stop flanges 91 and 92 extending inwardly from the central mounting bracket legs 44a and 45a. When the pulley belt 18 is moved to the groove 37 the blower is placed in its second faster position and likewise, the switch is moved to its second heat input position to change the heat input rate accordingly.

Figure 5:
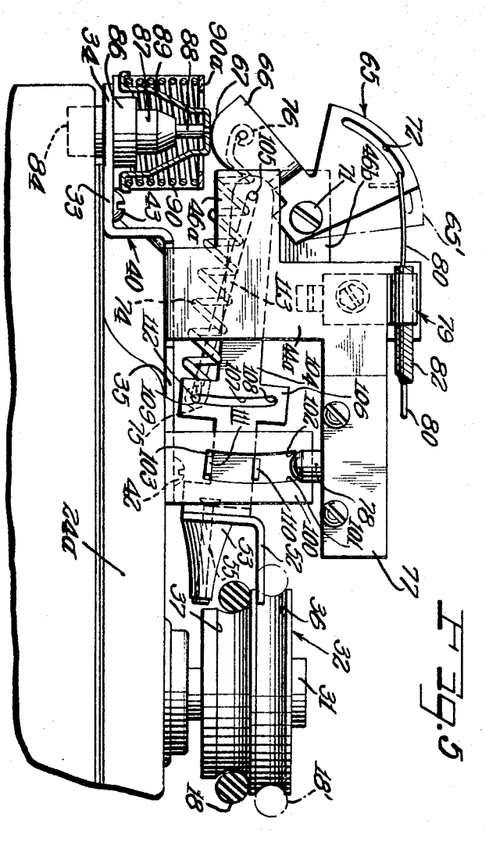
FIGURE 5 is a partial bottom view with parts in cross-section and elevation, similar to the view of FIGURE 4, illustrating another embodiment of a belt shifter constructed in accordance with the principles of the present invention.

Referring to FIGURE 5 there is illustrated another belt shifter constructed in accordance with the principles of the present invention wherein the belt shifter frame has a guide bracket 100 extending outwardly from the bottom of the base angle arm forward end 35. The guide bracket has an arcuate slot 101 formed therein having an outer end 102 and an inner end 103. A lever arm 104 has one end pivotally connected to the bracket arm 46a by pivot means 105 and has the belt shifting means 51 attached to its other end. The lever arm has a free-ride portion 106 having an arcuate slot 107 with an outer end 108 and an inner end 109. Between the belt shifting means 51 and the free-ride portion 106 are two spaced downwardly extending parallel flange members 110 and 111 extending substantially perpendicular to the bottom walls of the lever bar. The flange means ride in the arcuate guide slot 101 formed in the guide 100. The outer flange 110 is preferably longer than the inner flange 111 in order to contact the switch actuator 78 as well as acting as a stop means that cooperates with the guide end 102 to limit the outward movement of the lever 104.

A spring lever 113 has one end connected to ride means 112 which moves in the lever free-ride slot 107. The other end of the spring lever is connected to pivot means 105. The over-center tension spring 74 has its one end 75 connected to the ride means 112 and the other end 76 connected to the lever arm 66. It is of course understood that the spring lever may if desired form the pivot means 105 for the lever arm 104 as well as the ride means 112.

The belt shifter of FIGURE 5 operates in the same manner as the belt shifter of FIGURES 3 and 4. When the thermostat 38 pivots the lever 65 to its position 65', the spring lever first pivots from its position illustrated in FIGURE 5 to a position where the ride means 112 moves in the slot 107 and abuts the slot end wall 108 to have the spring 74 pivot the lever 104 outwardly therefrom. Thus, having the shifter roller 53 instantaneously move the belt 18 from the inner groove 37 to the outer groove 36.

It will be understood that these embodiments of the invention have been used for illustrative purposes only and that various modifications and variations in the present invention may be effected without departig from the spirit and scope of the novel concept thereof as is set forth in the hereunto appended claims.

I claim as my invention:
1. In a dryer apparatus having a heat treatment zone, a motor, a two-speed blower having a driving hub with two pulley grooves of different diameter, and a pulley belt connected to said motor and said blower drive hub to rotate said blower, a belt shifting mechanism comprising:
   a frame having a base mounted adjacent the blower and outwardly extending mounting bracket means,
   a first lever pivotally mounted to the mounting brackets and spaced a predetermined distance from said pulley belt,
   pivot stop means mounted on said frame to limit the pivotal movement of said first lever,
   a belt shifting member mounted on said first lever and having a pair of spaced legs extending a predetermined distance therefrom such that they overlap the pulley belt and are spaced apart such that the pulley belt moves freely therebetween,
   said first lever stop means permitting the first lever to pivot a predetermined amount such that one of the belt shifting legs will contact the pulley belt and shift the pulley belt from one blower hub groove to the other blower hub groove,
   a spring lever pivotally mounted to said bracket means,
   said spring lever having means to pivot said first lever,
   a second lever pivotally mounted to the bracket means,
   an over-center spring attached to the spring lever and the second lever,
   said spring being connected to instantaneously pivot said spring lever when said second lever is pivoted a predetermined distance to thereby pivot the first lever, and
   automatic means in communication with the dryer treatment zone to sense temperature changes therein and in communication with said second lever to automatically pivot said second lever in response to changes of temperature in said treatment zone.

2. In a dryer apparatus having a heat treatment zone, a single speed motor, a two-speed blower having a driving hub with two pulley grooves of different diameter, and a pulley belt connected to said motor and said blower drive hub to rotate said blower, a belt shifting mechanism comprising:
   a frame having a base mounted adjacent the blower and a pair of spaced outwardly extending mounting brackets,
   a first lever pivotally mounted between the mounting brackets and spaced a predetermined distance from said pulley belt,
   pivot stop means mounted on said frame to limit the pivotal movement of said first lever,
   a belt shifting member mounted on said first lever and having a pair of spaced legs extending a predetermined distance therefrom such that they overlap the pulley belt and are spaced apart such that the pulley belt moves freely therebetween,
   said first lever stop means permitting the first lever to pivot a predetermined amount such that one of the belt shifting legs will contact the pulley belt and shift the pulley belt from one blower hub groove to the other blower hub groove,
   a spring lever pivotally mounted to said first lever,
   means connected to said first lever to form a free-ride means to limit the pivotal movement of said spring lever with respect to said first lever and to permit said spring lever to pivot said first lever after said limited pivotal movement,
   a second lever pivotally mounted to the mounting brackets,
   an over-center tension spring having one end attached to the spring lever and the other end attached to the second lever,
   said tension spring being connected to instantaneously pivot said spring lever when said second lever is pivoted a predetermined distance, said free-ride means permitting said spring lever to pivot with respect to the first lever a predetermined amount before pivoting said first lever, and automatic means in communication with the dryer treatment zone to sense temperature changes therein and in communication with said second lever to automatically pivot said second lever in response to changes of temperature in said treatment zone.

3. In a dryer apparatus having a heat treatment zone, a two-speed blower having a driving hub with two pulley grooves of different diameter, and a pulley belt connected to said motor and said blower drive hub to rotate said blower, a belt shifting mechanism comprising:

a frame having a base mounted adjacent the blower and a pair of spaced outwardly extending mounting brackets, a first lever having one end pivotally mounted between the mounting brackets and having its other end spaced a predetermined distance from said pulley belt, a pivot stop means mounted on said frame to limit the pivotal movement of said first lever, a belt shifting member mounted on said first lever other end and having a pair of spaced legs extending a predetermined distance such that they overlap the pulley belt and are spaced apart such that the pulley belt moves freely therebetween, said first lever stop means permitting the first lever to pivot a predetermined amount such that one of the belt shifting legs will contact the pulley belt and shift the pulley belt from one blower hub groove to the other blower hub groove, a spring lever having one end pivotally mounted to said first lever, means connected to said first lever to form a free-ride pivot means for said spring lever with respect to said first lever by said spring lever, a second lever having a central leg and a side leg pivotally mounted to one of the mounting brackets, an over-center tension spring having one end attached to the spring lever and the other end attached to the second lever central leg, said tension spring being connected to instantaneously pivot said spring lever when said second lever is pivoted a predetermined distance, said free-ride means permitting said spring lever to pivot with respect to the first lever a predetermined amount before the spring lever engages an end thereof and instantaneously pivots said first lever, and thermostat means having a power member and a temperature sensitive portion mounted on said dryer with said temperature sensitive portion in communication with the dryer treatment zone to sense temperature changes therein and the power member in communication with said second lever to automatically pivot said second lever in response to changes of temperature in said treatment zone.

4. In a dryer apparatus having a heat treatment zone, a single speed motor, a two-speed blower having a driving hub with two pulley grooves of different diameter, and a pulley belt connected to said motor and said blower drive hub to rotate said blower, a belt shifting mechanism comprising:

a frame having a base mounted adjacent the blower and a pair of spaced outwardly extending mounting brackets, a first lever having one end pivotally mounted between the mounting brackets and having the other end spaced a predetermined distance from said pulley belt, pivot stop means mounted on said frame to limit the pivotal movement of said first lever, a belt shifting member mounted on said first lever other end and having a pair of spaced legs extending a predetermined distance therefrom such that they overlap the pulley belt and are spaced apart such that the pulley belt moves freely therebetween, one of said belt shifting legs being a stationary bar member and the other belt shifting leg being a free rotating plastic roller having a concave outer surface, said first lever stop means permitting the first lever to pivot a predetermined amount such that one of the belt shifting legs will contact the pulley belt and shift the pulley belt from one blower hub groove to the other blower hub groove, a spring lever having one end pivotally mounted to said first lever, means connected to said first lever to form a free-ride pivot means for said spring lever with respect to said first lever by said spring lever, a second lever having a central leg and a side leg pivotally mounted to one of the mounting brackets, an over-center tension spring having one end attached to the spring lever and the other end attached to the second lever central leg, said tension spring being connected to instantaneously pivot said spring lever when said second lever is pivoted a predetermined distance, said free-ride means permitting said spring lever to pivot with respect to the first lever a predetermined amount before the spring lever engages an end thereof and instantaneously pivots said first lever, thermostat means having a power member and a temperature sensitive portion mounted on said dryer with said temperature sensitive portion in communication with the dryer treatment zone to sense temperature changes therein and the power member in communication with said second lever to automatically pivot said second lever in response to changes of temperature in said treatment zone, and manual over-ride means connected to said second lever to manually pivot said second lever.

5. In a dryer apparatus having a heat treatment zone, a single speed motor, a two-speed blower having a driving hub with two pulley grooves of different diameter, and a pulley belt connected to said motor and said blower drive hub to rotate said blower, a belt shifting mechanism comprising:

a frame having a base mounted adjacent the blower and a pair of spaced outwardly extending mounting brackets, a first U-shaped lever pivotally mounted between the mounting brackets and having its base spaced a predetermined distance from said pulley belt with its two legs extending therefrom, pivot stop means mounted on said frame to limit the pivotal movement of said first lever, a belt shifting member mounted on said first lever base and having a pair of spaced legs extending a predetermined distance therefrom such that they overlap the pulley belt and are spaced apart such that the pulley belt moves freely therebetween, one of said belt shifting legs being a stationary bar member and the other belt shifting leg being a free rotating plastic roller having a concave outer surface, said first lever stop means permitting the first lever to pivot a predetermined amount such that one of the belt shifting legs will contact the pulley belt and shift the pulley belt from one blower hub groove to the other blower hub groove, a spring U-shaped lever pivotally mounted within said first lever, said spring lever having a base adjacent the first lever base and legs with outturned ends pivotally passing through the first lever legs to form the pivot pins therefor and pivotally connected to the mounting brackets, means connected to said first lever to form a free-ride pivot means for said spring lever with respect to said first lever, a second lever having a central leg and a side leg pivotally mounted to one of the mounting brackets, an over-center tension spring having one end attached to the spring lever base and the other end attached to the second lever central leg, said tension spring being connected to instantaneously pivot said spring lever when said second lever is pivoted a predetermined distance, said free-ride means permitting said spring lever to pivot with respect to the first lever a predetermined amount before the spring lever engages an end thereof and instantaneously pivoting said first lever, theromstat means having a power member and a temperature sensitive portion mounted on said dryer with said temperature sensitive portion in communication with the dryer treatment zone to sense temperature changes therein and the power member in communication with said second lever to automatically pivot said second lever in response to changes of temperature in said treatment zone, and manual over-ride means connected to said second lever to manually pivot said second lever.

6. In a dryer apparatus having a heat treatment zone, a two position heat input means for supplying heat to the treatment zone, a single speed motor, a two-speed blower having a driving hub with two pulley grooves of different diameter, and a pulley belt connected to said motor and said blower drive hub to rotate said blower, a belt shifting mechanism comprising:

a frame having a base mounted adjacent the blower and a pair of spaced outwardly extending mounting brackets each having a side arm, a first U-shaped lever pivotally mounted between the mounting brackets and having its base spaced a predetermined distance from said pulley belt with its two legs extending therefrom, pivot stop means mounted on said frame to limit the pivotal movement of said first lever, a belt shifting member mounted on said first lever base and having a pair of spaced legs extending a predetermined distance therefrom such that they overlap the pulley belt and are spaced apart such that the pulley belt moves freely therebetween, one of said belt shifting legs being a stationary bar member and the other belt shifting leg being a free rotating plastic roller having a concave outer surface, said first lever stop means permitting the first lever to pivot a predetermined amount such that one of the belt shifting legs will contact the pulley belt and shift the pulley belt from one blower hub groove to the other blower hub groove, a spring U-shaped lever pivotally mounted within said first lever, said spring lever having a base adjacent the first lever base and legs with outturned ends pivotally passing through the first lever legs to form the pivot pins therefor and pivotally connected to the mounting brackets, means connected to said first lever to form a free-ride pivot means for said spring lever with respect to said first lever, a second lever having a central leg and a side leg pivotally mounted to one of the mounting brackets, an over-center tension coil spring having one end attached to the spring lever base and the other end attached to the second lever central leg, said tension spring being connected to instantaneously pivot said spring lever when said second lever is pivoted a predetermined distance, said free-ride means permitting said spring lever to pivot with respect to the first lever a predetermined amount before the spring lever engages an end thereof and instantaueously pivots said first lever, thermostat means having a power member and a temperature sensitive portion mounted on said dryer with said temperature sensitive portion in communication with the dryer treatment zone to sense temperature changes therein and the power member in communication with said second lever to automatically pivot said second lever in response to changes of temperature in said treatment zone, manual over-ride means connected to said second lever to manually pivot said second lever, a two-way heat input switch mounted on said frame and having a two-position contact member, and an actuator bar attached to said first lever to selectively actuate said switch contact member from one contact position to another contact position when said first lever is pivoted.

7. In a dryer apparatus having a heat treatment zone, a two position heat input means for supplying heat to the treatment zone, a single speed motor, a two-speed blower having a driving hub with two pulley grooves of different diameter, and a pulley belt connected to said motor and said blower drive hub to rotate said blower, a belt shifting mechanism comprising:

a frame having a base mounted adjacent the blower and a pair of spaced outwardly extending mounting brackets each having a side arm, a first U-shaped lever pivotally mounted between the mounting brackets and having its base spaced a predetermined distance from said pulley belt with its two legs extending therefrom, a pair of stop flanges extending inwardly a predetermined distance from at least one of said mounting brackets so as to overlap said first lever legs and act as a pivot stop means therefor, a belt shifting member mounted on said first lever base and having a pair of spaced legs extending a predetermined distance therefrom such that they overlap the pulley belt and are spaced apart such that the pulley belt moves freely therebetween, one of said belt shifting legs being a stationary bar member and the other belt shifting leg being a free rotating plastic roller having a concave outer surface, said first lever stop means permitting the first lever to pivot a predetermined amount such that one of the belt shifting legs will contact the pulley belt and shift the pulley belt from one blower hub groove to the other blower hub groove, a spring U-shaped lever pivotally mounted within said first lever, said spring lever having a base adjacent the first lever base and legs with outturned ends pivotally passing through the first lever legs to form the pivot pins therefor and pivotally connected to the mounting brackets, a pair of spaced stop flanges inwardly extending from each first lever leg to form a free-ride means for said spring lever and means to pivot said first lever by said spring lever, a second lever having a central leg and a side leg pivotally mounted to one of the mounting brackets, an over-center tension spring having one end attached to the spring lever base and the other end attached to the second lever central leg, said tension spring being connected to instantaneously pivot said spring lever when said second lever is pivoted a predetermined distance, said free-ride means permitting said spring lever to pivot with respect to the first lever a predetermined amount before engaging said free-ride stop flanges and instantaneously pivoting said first lever, thermostat means having a power member and a temperature sensitive portion mounted on said dryer with said temperature sensitive portion in communication with the dryer treatment zone to sense temperature changes therein and the power member in communication with said second lever to automatically pivot said second lever in response to changes of temperature in said treatment zone, manual over-ride means connected to said second lever to manually pivot said second lever, a two-way heat input switch mounted on said frame and having a two-position contact member, and an actuator bar attached to said first lever to selectively actuate said switch contact member from one contact position to another contact position when said first lever is pivoted.

8. In a dryer apparatus having a heat treatment zone, a two position heat input means for supplying heat to the treatment zone, a single speed motor, a two-speed blower having a driving hub with two pulley grooves of different diameter, and a pulley belt connected to said motor and said blower drive hub to rotate said blower, a belt shifting mechanism comprising:

a frame having a base mounted adjacent the blower and a pair of spaced outwardly extending mounting brackets each having a rearwardly extending arm, a first U-shaped lever pivotally mounted between the mounting brackets and having its base spaced rearwardly a predetermined distance from said pulley belt with its two legs extending rearwardly therefrom, a pair of stop flanges extending inwardly a predetermined distance from at least one of said mounting brackets so as to overlap said first lever legs and act as a pivot stop means therefor, a belt shifting member mounted on said first lever base and having a pair of spaced legs extending forwardly a predetermined distance such that they overlap the pulley belt and are spaced apart such that the pulley belt moves freely therebetween, one of said belt shifting legs being a stationary bar member and the other belt shifting leg being a free rotating plastic roller having a concave outer surface, said first lever stop means permitting the first lever to pivot a predetermined amount such that one of the belt shifting legs will contact the pulley belt and shift the pulley belt from one blower hub groove to the other blower hub groove, a spring U-shaped lever pivotally mounted within said first lever, said spring lever having a base adjacent the first lever base and rearwardly extending legs with outturned ends pivotally passing through the first lever legs to form the pivot pins therefor and pivotally connected to the mounting brackets, a pair of spaced stop flanges inwardly extending from each first lever leg to form a free-ride means for said spring lever and means to pivot said first lever by said spring lever, a second lever having a central leg and a side leg pivotally mounted to one of the mounting brackets, an over-center tension coil spring having one end attached to the spring lever base and the other end attached to the second lever central leg, said tension spring being connected to instantaneously pivot said spring lever when said second lever is pivoted a predetermined distance, said free-ride means permitting said spring lever to pivot with respect to the first lever a predetermined amount before engaging said free-ride stop flanges and instantaneously pivoting said first lever, thermostate means having a power member and a temperature sensitive portion mounted on said dryer with said temperature sensitive portion in communication with the dryer treatment zone to sense temperature changes therein and the power member in communication with said second lever to automatically pivot said second lever in response to changes of temperature in said treatment zone, manual over-ride means connected to said second lever to manually pivot said second lever, a two-way heat input switch mounted on said frame and having a two-position contact member, and an actuator bar attached to said first lever to selectively actuate said switch contact member from one contact position to another contact position when said first lever is pivoted.

9. In a dryer apparatus having a heat treatment zone, a single speed motor, a two-speed blower having a driving hub with two pulley grooves of different diameter, and a pulley belt connected to said motor and said blower drive hub to rotate said blower, a belt shifting mechanism comprising:

a frame having a base mounted adjacent the blower and a pair of spaced outwardly extending brackets each having a rearwardly extending arm, a first lever having one end pivotally mounted between the mounting brackets and its other end base spaced rearwardly a predetermined distance from said pulley belt, a guide bracket extending from said frame and having an arcuate stop groove formed therein, a pair of stop flanges extending outwardly a predetermined distance from said first lever so as to ride within the arcuate groove that acts as a pivot limiting means for said first lever, a belt shifting member mounted on said first lever base and having a pair of spaced legs extending forwardly a predetermined distance such that they overlap the pulley belt and are spaced apart such that the pulley belt moves freely therebetween, said stop groove permitting the first lever to pivot a predetermined amount such that one of the belt shifting legs will contact the pulley belt and shift the pulley belt from one blower hub groove to the other blower hub groove, a spring lever pivotally mounted within said brackets, said spring lever having a base means at one end adjacent the first lever base and pivot means at the other end, said pivot means pivotally connecting the spring lever to the mounting brackets, an arcuate free-ride groove formed in said first lever, said spring lever base means extending through said free-ride groove to ride therein, a second lever having a central leg and a side leg pivotally mounted to one of the mounting brackets, an over-center spring having one end attached to the spring lever base and the other end attached to the second lever central leg, said tension spring being connected to instantaneously pivot said spring lever when said second lever is pivoted a predetermined distance, said free-ride groove permitting said spring lever to pivot with respect to the first lever a predetermined amount before the spring lever base engages an end thereof and instantaneously pivots said first lever, thermostat means having a power member and a temperature sensitive portion mounted on said dryer with said temperature sensitive portion in communication with the dryer treatment zone to sense temperature changes therein and the power mmeber in communication with said second lever to automatically pivot said second lever in response to changes of temperature in said treatment zone, and manual over-ride means connected to said second lever to manually pivot said second lever.

10. In a dryer apparatus having a heat treatment zone, a motor, a two-speed blower having a driving hub with two pulley grooves of different diameter, and a pulley belt connected to said motor and said blower drive hub to rotate said blower, a belt shifting mechanism comprising:

a frame having a base mounted adjacent the blower, a first lever having one end pivotally mounted to the frame and having its other end spaced a predetermined distance from said pulley belt,
a guide bracket extending from said frame and having an arcuate stop groove formed therein,
stop means extending from said frame so as to ride within the arcuate groove and act as a pivot limiting means therefor,
a belt shifting member mounted on said first lever base and having a pair of spaced legs overlapping the pulley belt and spaced apart such that the pulley belt moves freely therebetween,
said first lever stop groove permitting the first lever to pivot a predetermined amount such that one of the belt shifting legs will contact the pulley belt and shift the pulley belt from one blower hub groove to the other blower hub groove,
a spring lever pivotally mounted to said frame,
said spring lever having a base means,
an arcuate free-ride groove formed in said first lever,
said spring lever base means extending through said free-ride groove to ride therein,
a second lever pivotally mounted to said frame,
an over-center spring having one end attached to the spring lever base means and the other end attached to the second lever,
said tension spring being connected to instantaneously pivot said spring lever when said second lever is pivoted a predetermined distance,
said free-ride groove permitting said spring lever to pivot with respect to the first lever a predetermined amount before pivoting said first lever,
automatic means in communication with the dryer treatment zone to sense temperature changes therein and in communication with said second lever to automatically pivot said second lever in response to changes of temperature in said treatment zone, and
manual over-ride means connected to said second lever to manually pivot said second lever.

11. In a dryer apparatus having a heat treatment zone, a motor, a two-speed blower having a driving hub with two pulley grooves of different diameter, and a pulley belt connected to said motor and said blower drive hub to rotate said blower, a belt shifting mechanism comprising:
a frame having a base mounted adjacent the blower,
a first lever pivotally mounted to the frame, and spaced a predetermined distance from said pulley belt,
a guide bracket extending from said frame and having an arcuate stop groove formed therein,
stop means extending from said frame and riding within the groove to act as a pivot limiting means therefor,
a belt shifting member mounted on said first lever base and having a pair of spaced legs overlapping the pulley belt and spaced apart such that the pulley belt moves freely therebetween,
said first lever stop groove permitting the first lever to pivot a predetermined amount such that one of the belt shifting legs will contact the pulley belt and shift the pulley belt from one blower hub groove to the other blower hub groove,
a spring lever pivotally mounted to said frame,
said spring lever having a base means,
an arcuate free-ride groove formed in said first lever,
said spring lever base means extending through said free-ride groove to ride therein,
a second lever pivotally mounted to said frame,
an over-center spring having one end attached to the spring lever and the other end attached to the second lever,
said tension spring being connected to instantaneously pivot said spring lever when said second lever is pivoted a predetermined distance,
said free-ride groove permitting said spring lever to pivot with respect to the first lever a predetermined amount before pivoting said first lever, and
automatic means in communication with the dryer treatment zone to sense temperature changes therein and in communication with said second lever to automatically pivot said second lever in response to changes of temperature in said treatment zone.

12. In a dryer apparatus having a heat treatment zone, a two position heat input means for supplying heat to the treatment zone, a single speed motor, a two-speed blower having a driving hub with two pulley grooves of different diameter, and a pulley belt connected to said motor and said blower drive hub to rotate said blower, a belt shifting mechanism comprising:
a frame having a base mounted adjacent the blower and a pair of spaced outwardly extending brackets each having a rearwardly extending arm,
a first lever having one end pivotally mounted between the mounting brackets and its other end spaced rearwardly a predetermined distance from said pulley belt,
a guide bracket extending outwardly from the frame base and having an arcuate stop groove formed therein,
a pair of stop flanges extending outwardly a predetermined distance from said first lever so as to ride within the arcuate groove that acts as a pivot limiting means for said first lever,
a belt shifting member mounted on said first lever base and having a pair of spaced legs extending forwardly a predetermined distance such that they overlap the pulley belt and are spaced apart such that the pulley belt moves freely therebetween,
one of said belt shifting legs being a stationary bar member and the other belt shifting leg being a free rotating plastic roller having a concave outer surface,
said stop groove permitting the first lever to pivot a predetermined amount such that one of the belt shifting legs will contact the pulley belt and shift the pulley belt from one blower hub groove to the other blower hub grove,
a spring lever pivotally mounted within said brackets,
said spring lever having a base means at one end adjacent the first lever base and pivot means at the other end,
said pivot means pivotally connecting the spring lever to the mounting brackets,
an arcuate outwardly extending free-ride groove formed in said first lever,
said spring lever base means extending from said spring lever and through said free-ride groove to ride therein,
a second lever having a central leg and a side leg pivotally mounted to one of the mounting brackets,
an over-center tension coil spring having one end attached to the spring lever base and the other end attached to the second lever central leg,
said tension spring being connected to instantaneously pivot said spring lever when said second lever is pivoted a predetermined distance,
said free-ride groove permitting said spring lever to pivot with respect to the first lever a predetermined amount before the spring lever base engages an end thereof and instantaneously pivots said first lever,
thermostat means having a power member and a temperature sensitive portion mounted on said dryer with said temperature sensitive portion in communication with the dryer treatment zone to sense temperature changes therein and the power member in communication with said second lever to automatically pivot said second lever in response to changes of temperature in said treatment zone,
manual over-ride means connected to said second lever to manually pivot said second lever,
a two-way heat input switch mounted on said frame and having a two-position contact member, and an actuator bar attached to said first lever to selectively actuate said switch contact member from one contact position to another contact position when said first lever is pivoted.

13. A belt shifting mechanism for shifting a belt from one pulley groove to another pulley groove comprising:
a frame,
a first lever pivotally mounted to the frame,
pivot stop means mounted on said frame to limit the pivotal movement of said first lever,
a belt shifting member mounted on said first lever and having a pair of spaced legs extending a predetermined distance therefrom,
said first lever stop means being adapted to permit the first lever to pivot a predetermined amount such that one of the belt shifting legs will contact the belt and shift the belt from one pulley groove to the other groove,
a spring lever pivotally mounted to said frame,
means connected to said first lever to form a free-ride means to limit the pivotal movement of said spring lever with respect to said first lever and to permit said spring lever to pivot said first lever after said limited pivotal movement,
a second lever pivotally mounted to the frame,
an over-center spring having one end attached to the spring lever and the other end attached to the second lever,
said tension spring being connected to instantaneously pivot said spring lever when said second lever is pivoted a predetermined distance,
said free-ride means permitting said spring lever to pivot with respect to the first lever a predetermined amount before pivoting said first lever,
automatic means in communication with said second lever to automatically pivot said second lever in response to changes of temperature, and
manual over-ride means connected to said second lever to manually pivot said second lever.

14. A belt shifting mechanism for shifting a belt from one pulley groove to another pulley groove comprising:
a frame having a base and outwardly extending mounting bracket means,
a first lever pivotally mounted to the mounting brackets,
a belt shifting member mounted on said first lever and having a pair of spaced legs extending a predetermined distance therefrom and spaced a predetermined distance apart,
a spring lever pivotally mounted to said bracket means,
said spring lever having means to pivot said first lever,
a second lever pivotally mounted to the bracket means,
an over-center spring attached to the spring lever and the second lever, and
said spring being connected to instantaneously pivot said spring lever when said second lever is pivoted a predetermined distance to thereby pivot the first lever.

15. A belt shifting mechanism for shifting a belt from one pulley groove to another pulley groove comprising:
a frame having a base and a pair of spaced outwardly extending mounting brackets,
a first lever having one end pivotally mounted between the mounting brackets,
a pivot stop means mounted on said frame to limit the pivotal movement of said first lever a predetermined amount,
a belt shifting member mounted on said first lever other end and having a pair of spaced legs extending a predetermined distance and spaced a predetermined distance apart,
a spring lever having one end pivotally mounted to said first lever,
means connected to said first lever to form a free-ride pivot means for said spring lever with respect to said first lever by said spring lever,
a second lever having a central leg and a side leg pivotally mounted to one of the mounting brackets,
an over-center tension spring having one end attached to the spring lever and the other end attached to the second lever central leg,
said tension spring being connected to instantaneously pivot said spring lever when said second lever is pivoted a predetermined distance, and
said free-ride means permitting said spring lever to pivot with respect to the first lever a predetermined amount before the spring lever engages an end thereof and instantaneously pivots said first lever.

16. A belt shifting mechanism for shifting a belt from one pulley groove to another pulley groove comprising:
a frame having a base and a pair of spaced outwardly extending mounting brackets,
a first U-shaped lever pivotally mounted between the mounting brackets,
a pivot stop means mounted on said frame to limit the pivotal movement of said first lever,
a belt shifting member mounted on said first lever base and having a pair of legs extending a predetermined distance therefrom and spaced a predetermined distance apart,
one of said belt shifting legs being a stationary bar member and the other belt shifting leg being a free rotating plastic roller having a concave outer surface,
a spring U-shaped lever pivotally mounted within said first lever,
said spring lever having a base adjacent the first lever base and legs with outturned ends pivotally passing through the first lever legs to form the pivot pins therefor and pivotally connected to the mounting brackets,
means connected to said first lever to form a free-ride pivot means for said spring lever with respect to said first lever,
a second lever having a central leg and a side leg pivotally mounted to one of the mounting brackets,
an over-center tension spring having one end attached to the spring lever base and the other end attached to the second lever central leg,
said tension spring being connected to instantaneously pivot said spring lever when said second lever is pivoted a predetermined distance, and
said free-ride means permitting said spring lever to pivot with respect to the first lever a predetermined amount before the spring lever engages an end thereof and instantaneously pivoting said first lever.

17. A belt shifting mechanism for shifting a belt from one pulley groove to another pulley groove comprising:
a frame having a base and a pair of spaced outwardly extending mounting brackets each having a side arm,
a first U-shaped lever pivotally mounted between the mounting brackets,
pivot stop means mounted on said frame to limit the pivotal movement of said first lever,
a belt shifting member mounted on said first lever base and having a pair of spaced legs extending a predetermined distance therefrom,
one of said belt shifting legs being a stationary bar member and the other belt shifting leg being a free rotating plastic roller having a concave outer surface,
a spring U-shaped lever pivotally mounted within said first lever,
said spring lever having a base adjacent the first lever base and legs with outturned ends pivotally passing through the first lever legs to form the pivot pins therefor and pivotally connected to the mounting brackets,
means connected to said first lever to form a free-ride pivot means for said spring lever with respect to said first lever, a second lever having a central leg and a side leg pivotally mounted to one of the mounting brackets,
an over-center tension coil spring having one end attached to the spring lever base and the other end attached to the second lever central leg,
said tension spring being connected to instantaneously pivot said spring lever when said second lever is pivoted a predetermined distance,
said free-ride means permitting said spring lever to pivot with respect to the first lever a predetermined amount before the spring lever engages an end thereof and instantaneously pivots said first lever,
manual over-ride means connected to said second lever to manually pivot said second lever,
a two-way heat input switch mounted on said frame and having a two-position contact member, and
an actuator bar attached to said first lever to selectively actuate said switch contact member from one contact position to another contact position when said first lever is pivoted.

18. A belt shifting mechanism for shifting a belt from one pulley groove to another pulley groove comprising:
a frame having a base and a pair of spaced outwardly extending brackets each having a rearwardly extending arm,
a first lever having one end pivotally mounted between the mounting brackets,
a guide bracket extending from said frame and having an arcuate stop groove formed therein,
a pair of stop flanges extending outwardly a predetermined distance from said first lever so as to ride within the arcuate groove that acts as a pivot limiting means for said first lever,
a belt shifting member mounted on said first lever base and having a pair of spaced legs extending forwardly a predetermined distance,
a spring lever pivotally mounted within said brackets,
said spring lever having a base means at one end adjacent the first lever base and pivot means at the other end,
said pivot means pivotally connecting the spring lever to the mounting brackets,
an arcuate free-ride groove formed in said first lever,
said spring lever base means extending through said free-ride groove to ride therein,
a second lever having a central leg and a side leg pivotally mounted to one of the mounting brackets,
an over-center spring having one end attached to the spring lever base and the other end attached to the second lever central leg,
said tension spring being connected to instantaneously pivot said spring lever when said second lever is pivoted a predetermined distance, and
said free-ride groove permitting said spring lever to pivot with respect to the first lever a predetermined amount before the spring lever base engages an end thereof and instantaneously pivots said first lever.

19. A belt shifting mechanism for shifting a belt from one pulley groove to another pulley groove comprising:
a frame having a base,
a first lever pivotally mounted to the frame,
a guide bracket extending from said frame and having an arcuate stop groove formed therein,
stop means extending from said frame and riding within the groove to act as a pivot limiting means therefor,
a belt shifting member mounted on said first lever base and having a pair of spaced legs,
a spring lever pivotally mounted to said frame,
said spring lever having a base means,
an arcuate free-ride groove formed in said first lever,
said spring lever base means extending through said free-ride groove to ride therein,
a second lever pivotally mounted to said frame,
an over-center spring having one end attached to the spring lever and the other end attached to the second lever,
said tension spring being connected to instantaneously pivot said spring lever when said second lever is pivoted a predetermined distance, and
said free-ride groove permitting said spring lever to pivot with respect to the first lever a predetermined amount before pivoting said first lever.

20. A belt shifting assembly for shifting a pulley belt between differently sized pulley grooves on a pulley wheel comprising:
a support carrying said pulley wheel for rotatable movement about an axis of the wheel,
an elongated shiftable member pivotally mounted about its transverse axis on said support,
a head formed on said shiftable member embracing said pulley belt while permitting free travel thereof about said pulley wheel,
abutment surfaces formed on said shiftable member at points spaced equidistantly from the pivot point of said shiftable member and on opposite sides of the said longitudinal axis thereof,
a spring connection member,
means mounting said spring connection member on said shiftable member for movement between said abutment surfaces,
a shiftable spring connection point mounted on said support and movable between different positions on the same side of said abutment surfaces as the pivot of said shiftable member,
a tension spring interconnecting said spring connection point and said spring connection member,
motor means cooperable with said spring connection point to move said point on opposite sides of the longitudinal axis of said spring in a plane parallel to the plane of movement of said spring connection member and said shiftable member, and
independently manually operable means for shifting spring connection point in a like manner.

References Cited by the Examiner

UNITED STATES PATENTS

| | | | |
|---|---|---|---|
| 951,513 | 3/1910 | Rohrbacher | 74—242 X |
| 961,417 | 6/1910 | Litchfield | 74—242 |
| 1,666,917 | 4/1928 | Sargent | 34—54 |
| 2,106,930 | 2/1938 | Nigra | 74—217 |

FREDERICK L. MATTESON, Jr., *Primary Examiner.*

D. A. TAMBURRO, *Assistant Examiner.*